United States Patent

Poullin

(10) Patent No.: US 6,999,025 B2
(45) Date of Patent: Feb. 14, 2006

(54) CLUTTER REJECTION IN A PASSIVE RADAR RECEIVER OF OFDM SIGNALS WITH ANTENNA ARRAY

(75) Inventor: Dominique Poullin, Chatillon (FR)

(73) Assignee: Onera, Chatillon (FR)

( * ) Notice: Subject to any disclaimer, the term of this patent is extended or adjusted under 35 U.S.C. 154(b) by 168 days.

(21) Appl. No.: 10/469,188

(22) PCT Filed: Feb. 19, 2002

(86) PCT No.: PCT/FR02/04468
§ 371 (c)(1),
(2), (4) Date: Aug. 26, 2003

(87) PCT Pub. No.: WO03/056358
PCT Pub. Date: Jul. 10, 2003

(65) Prior Publication Data
US 2004/0257270 A1 Dec. 23, 2004

(30) Foreign Application Priority Data
Dec. 26, 2001 (FR) .......................................... 01 16898

(51) Int. Cl.
*G01S 13/528* (2006.01)

(52) U.S. Cl. ................ 342/159; 342/162; 342/163; 342/107; 342/108; 342/148; 342/189; 342/192

(58) Field of Classification Search ................ 342/159, 342/162, 189, 163, 192, 196, 107, 108, 148
See application file for complete search history.

(56) References Cited

U.S. PATENT DOCUMENTS

| 6,525,686 B2 * | 2/2003 | Haruta et al. ............... 342/160 |
| 2004/0257270 A1 * | 12/2004 | Poullin ....................... 342/159 |

FOREIGN PATENT DOCUMENTS

| FR | 2 719 382 | 11/1995 |
| FR | 2 776 438 | 9/1999 |
| FR | 2 820 507 | 8/2002 |

\* cited by examiner

*Primary Examiner*—Daniel Pihulic
(74) *Attorney, Agent, or Firm*—Lowe, Hauptman & Berner, LLP

(57) ABSTRACT

The invention concerns a passive radar receiver with an array of antennas for a OFDM received signal comprising frames of symbols each emitted on coded orthogonal carriers. After formatting received signals into digital symbols, dummy signals from dummy OFDM emitters at different distances from and in different directions relative to the receiver are generated and added to the signals picked up by the antennas. The modified received signals are filtered by means of inverse covariance matrices in order to eliminate at least unwanted zero Doppler effect signals and to provide an isotropic reception diagram without blind sector of direct path being generated and by detecting mobile targets along the direct path.

7 Claims, 6 Drawing Sheets

CLUTTER REJECTION IN A PASSIVE RADAR RECEIVER OF OFDM SIGNALS WITH ANTENNA ARRAY

REFERENCE TO RELATED APPLICATION

This application is the National stage of International Application No. PCT/FR02/04468 filed Dec. 19, 2002, which is based on the French Application No. 01-16898 filed Dec. 26, 2001.

BACKGROUND OF THE INVENTION

1. Field of the Invention

The present invention relates to a passive radar receiver receiving a radio signal comprising frames of symbols each emitted on orthogonal coded carriers.

2. Background Art

In the radar field, it is generally difficult, if not impossible, to achieve the theoretically achievable detection performance limits for a mobile target. This is because detection performances are conditioned by the signal to thermal noise ratio at the output of a tuned filter in the radar receiver and in practise is generally limited not by thermal noise but by clutter at the output of the tuned filter. In the present context the term clutter is to be interpreted in the wide sense of all paths with zero Doppler effect. For example, for a bistatic radar with distant emitter and receiver, the clutter designates all of the following paths: the direct path from the emitter and each path received following reflection by a fixed obstacle.

Various methods of rejecting these unwanted signals are known in the art but have nonnegligible drawbacks. For example, adaptive rejection methods based on using a covariance matrix of the signals received by an array of sensors have the following limitations:

They eliminate only a limited number of decorrelated interference signals, characterized by their direction. Consequently, these methods are not optimized in the context of the fight against clutter when the latter is rich in multiple paths with different time-delays.

They lead to the creation of blind axes, associated with the rejected signals, on which it becomes impossible to detect a target.

They reject only signals whose signal to noise ratio is positive after angular compression. This rejection is limiting if it is effected at the beginning of radar processing, i.e. before distance-Doppler compression.

The invention is more particularly directed to the rejection of all zero Doppler effect signals in the clutter picked up by a passive radar receiver of particular orthogonal frequency division multiplex (OFDM) signals. OFDM signals are characterized by simultaneously emitting a large number of orthogonal sub-carriers phase coded with plural phase or amplitude states, i.e. by a spectrum of orthogonal lines, in the Fourier transform sense, over a finite duration T, equidistant at intervals 1/T.

A bistatic radar disclosed in the French patent application FR 2776438 processes coded OFDM (COFDM) digital radio signals in the context of radio and television broadcasts conforming to the European Digital Audio Broadcasting (DAB) and Digital Video Broadcasting (DVB) standards. These signals, which are therefore sent by emitters of opportunity in the case of passive radar receiver applications, ensure optimum use of the spectrum emitted, in a similar manner to white noise, and are resistant to multipath propagation and interference.

According to the above patent application, the radar receiver comprises a plurality of receive antennas for detecting the signals. The radar processing is based on Doppler-distance correlation of the signals received with a emitted signal time reference. The time reference is obtained by decoding the signals recorded conforming to the radio telecommunications operations effected.

However, because of the bistatic nature of the radar system, the power of the direct path signal is high compared to that of the wanted signal reflected by a target. The direct path should be rejected before effecting the Doppler-distance correlation. The energy contained in the distance-Doppler secondary lobes of the direct path is generally significantly higher than the thermal noise, so that targets situated in the vicinity of the direct path are difficult to detect.

PCT International Application PCT/FR02/00224 filed on Jan. 18, 2002 and not yet published, proposes a radar receiver for OFDM radio signals received via a propagation channel and comprising frames of symbols each emitted on orthogonal coded carriers. The radar receiver seeks to eliminate the contribution correlation of the direct path and more generally of unwanted zero Doppler effect signals to the processing of received signals before Doppler-distance. The radar receiver referred to comprises shaping means for converting the received signal into the form of a digital symbol signal, Doppler-distance correlation means for discriminating mobile targets, and filtering means for eliminating in the symbol signal at least unwanted zero Doppler effect signals in order to apply a filtered signal including essentially signals backscattered by targets to the correlation means. The radar receiver can comprise a plurality of receive channels.

However, although the filtering means based on inverse matrices of covariance matrices each depending on products of spectral lines of the symbol signals relating to a respective carrier reject all of the clutter, i.e. essentially the unwanted zero Doppler effect signals, the receiver does not provide isotropic spatial coverage. After filtering, the radiation diagrams of the filtered signals corresponding to the receive channels feature blind sectors, i.e. "gaps" in the directions in which correlated zero Doppler effect signals are received, especially if the latter signals are at high powers.

Adaptive filtering of the lines of the received OFDM signals causes rejection losses that can result from correlation between the directional vector related to a mobile target and one of the vectors associated with the zero Doppler effect signals that must be filtered. Mobile targets in the blind direction in which the unwanted zero Doppler effect signals are eliminated can no longer be detected.

OBJECT OF THE INVENTION

The object of the present invention is to limit the losses associated with the colinearity of the direct path directional vector to be eliminated and a directional target vector, where applicable, i.e. with the correlation of direct path signals and any signals backscattered by a mobile target. After filtering, a slightly attenuated and isotropic reception diagram is obtained in which the contribution of the zero Doppler effect signals has been eliminated.

SUMMARY OF THE INVENTION

To reach this object, a radar receiver processing a radio signal received via a propagation channel and comprising frames of symbols each emitted on coded orthogonal carriers, comprising N receiver means, shaping means for converting N signals received by the receiver means into N digital symbol signals, N being an integer more than 1, and Doppler-distance correlation means for discriminating mobile targets, is characterized in that it comprises means for creating N−1 dummy signals that are analogous to a reference signal representative of unwanted zero Doppler effect signals in the N received symbol signals and that were emitted virtually along directional vectors orthogonal to each other and to a directional vector of the real direct path between the real emitter of the emitted symbols and the radar receiver in an N-dimensional frame of reference and time-delayed relative to each other and relative to the real direct path by different integer multiples of the reciprocal of the bandwidth of the carriers, means for adding each received symbol signal to the N−1 dummy signals to produce modified received signals, and filtering means for eliminating unwanted zero Doppler effect signals in the modified received signals in order to apply filtered symbol signals including essentially signals backscattered by targets to the correlation means.

According to the invention, dummy signals from a plurality of dummy OFDM emitters at different distances from and in different directions relative to the radar receiver are added to the signals really picked up by the antennas to produce modified received signals that are representative of a "composite" propagation channel. The composite channel is characterized by a propagation vector in the OFDM carrier band which, on average, is virtually orthogonal to all possible directional vectors for direct path and free space multiple paths. The radiation diagram after filtering is virtually isotropic, the blind sectors or gaps caused by the elimination of Doppler effect signals no longer being present. Mobile targets can then be detected along the real direct path directional vector.

In a preferred embodiment based on processing of digital symbol signals received after Fourier transformation thereof into groups of spectral lines corresponding to the orthogonal carriers, the means for creating the N−1 dummy signals comprises means for estimating the direct path directional vector with N components as a function of $N^{th}$ order covariance matrices each dependent on products of spectral lines of the received symbol signals two by two in a group relating to a respective carrier, means for constructing an orthonomic base made up of direct path vector and N−1 orthogonal directional vectors, and means (83) for generating the N−1 dummy signals as a function of the product of the reference signal and angular coefficients depending on the directions of the N−1 orthogonal vectors and time-delay coefficients relative to the real direct path depending on products of the different integer multiples by the reciprocal of the bandwidth.

In order to produce the spectral lines of the reference signal, the radar receiver can comprise means for estimating the coefficients of the transfer function of the propagation channel as a function of the spectral lines of one of the received symbol signals for each symbol and averaging the coefficients of the transfer function over each frame. In an alternative there is provided means for correcting the spectral lines of the reference signal as a function of the direction of a target relative to the estimated direct path directional vector. There is also provided means for estimating an emitted signal replica as a function of the spectral lines of the reference signal, the estimated replica being correlated to the filtered symbol signals in the Doppler-distance correlation means.

In a similar manner to the radar receiver disclosed in the previously mentioned patent application No. 01-01695, the filtering means comprises means for estimating $N^{th}$ order covariance matrices each depending on products of the spectral lines of the modified received signals two by two in a group relating to a respective carrier, means for deducing inverse matrices of the covariance matrices, and means for filtering the groups of spectral lines respectively relating to the carriers in the modified received signals by multiplying the groups of lines by the respective inverse matrices to produce filtered groups of spectral lines. Following the filtering means, the radar receiver further comprises means for synthesizing the filtered groups of spectral lines into filtered symbol signals including essentially signals backscattered by targets applied to the correlation means. This embodiment also eliminates scatterers other than correlated coded COFDM signals.

To characterize better the transfer function of the propagation channel, the spectral line products on which the covariance matrices are dependent depend on spectral lines of symbols and are averaged over each frame.

BRIEF DESCRIPTION OF THE DRAWINGS

Other features and advantages of the present invention will become more clearly apparent on reading the following description of a plurality of preferred embodiments of the invention given with reference to the corresponding accompanying drawings, in which.

DETAILED DESCRIPTION OF THE DRAWINGS

Figure 1:
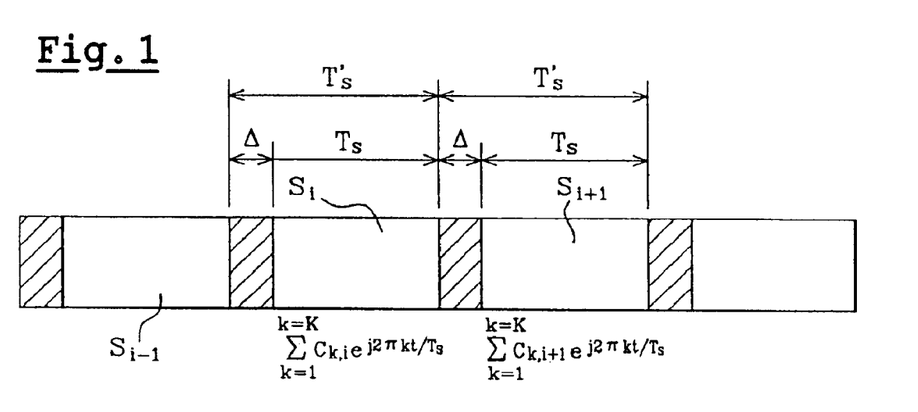
FIG. 1 is a timing diagram of successive symbols in an emitted COFDM signal.

The main characteristics of COFDM radiocommunication signals are summarized hereinafter, with reference to FIG. 1.

These baseband signals are emitted in symbol periods $T'_S$. A message contained in each of the emitted symbols is carried by a large number of sinusoids emitted simultaneously. These sinusoids constitute sub-carriers, referred to hereinafter for simplicity as "carriers", and are phase coded or amplitude coded. The carrier frequencies $f_1$ to $f_K$ are equidistant at intervals $1/T_S$. Each symbol $S_i$ emitted is the result of summing carriers as follows during the time period $T'_S$ ($T'_S > T_S$):

$$S_i = \sum_{k=1}^{k=K} C_{k,i} e^{2j\pi kt/T_S}$$

in which j designates the square root of −1 ($j^2=-1$) and t designates time.

The carriers at frequencies $f_k=k/T_S$ with $1 \leq k \leq K$ are therefore orthogonal to the duration $T_S$. $\Delta = T'_S - T_S$ designates the guard time.

Over an analysis period $T_S$, the COFDM signals thus constitute a band signal $K/T_S$ comprising a spectrum of K lines equidistant at the frequency step $1/T_S$ and each of width $1/T_S$. The carriers are modulated individually, for example using a four-state phase code expressed by the complex coefficients $C_{k,i}$, belonging to the alphabet (1+j, 1−j, −1+j, −1−j).

In practise, a data message may occupy only a few frequencies $f_k$ over a few symbol period $T'_S$ in the time-division and frequency-division multiplex comprising K frequencies and I time slots.

Figure 2:
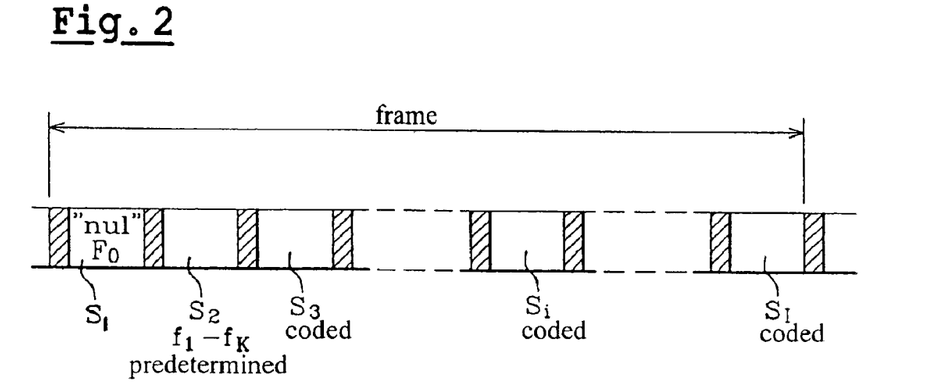
FIG. 2 is a timing diagram of a COFDM signal frame.

On emission, the symbols are organized into frames. Each frame shown in FIG. 2 comprises I symbols $S_1$ to $S_I$. The first symbol $S_1$ of the frame is a "null" symbol carrying no information and consists of the modulation carrier frequency $F_0$ of the emitted signal. The symbol $S_1$ is used for frame synchronization, i.e. to provide a time reference. The second symbol $S_2$ of the frame is used in the radar receiver, among other things, to learn the propagation channel, and contains the K carriers or sinusoids at the frequencies $f_1$ to $f_K$ having predetermined phases in the emitter. These K carriers in the symbol $S_1$ are used in the radar receiver to estimate the emitted signal, each carrier $f_k$ serving as a frequency and phase reference. Thanks to the first two symbols, at least the emission parameters $F_0$, $T_S$ and $f_1$ to $f_K$ can be acquired in this way. The other symbols $S_3$ to $S_I$ are intended to carry one or more data messages occupying each symbol partially or otherwise.

In radiocommunication, the received symbols are recovered with the aid of a frequency analysis of the received COFDM signals received over the time period $T_S$. The frequencies emitted being orthogonal in the Fourier transform (FFT) sense, each of the carriers is demodulated to reconstitute the information.

In practise, the orthogonality of the frequencies emitted is degraded by the following forms of interference:

intersymbol intracarrier interference: overlapping of signals coded differently or analysis time $T_S$ not suitable for the code;

intersymbol intercarrier interference: non-orthogonal signals over the analysis time $T_S$;

intrasymbol intracarrier interference: overlapping of signals coded differently;

intrasymbol intercarrier interference: non-stationary signals.

These interferences are associated with the multiple paths in the propagation channel between the emitter and the receiver.

The addition on the guard time $\Delta$ to each symbol period $T'_S$ eliminates all kinds of interference if the guard time $\Delta$ is greater than the temporal spreading of the propagation channel caused by multiple paths: there is then for each duration $T'_S$ a range, of length $T_S$, in which all the received multipath signals are coded identically.

The processing of the received signals including Doppler-distance correlation, the ambiguity function of the COFDM signals, and in particular of their secondary lobes, must be studied. The secondary lobes of the ambiguity function associated with the COFDM waveform are relatively uniform in the distance-Doppler plane, and their level relative to the main lobe is $-10.\log_{10}(I.K)$. The secondary lobes are lower at the base of the main lobe.

The analysis of the conventional radar balance shows that in general the energy contained in the secondary lobes associated with the direct path dominates over thermal noise.

Figure 3:
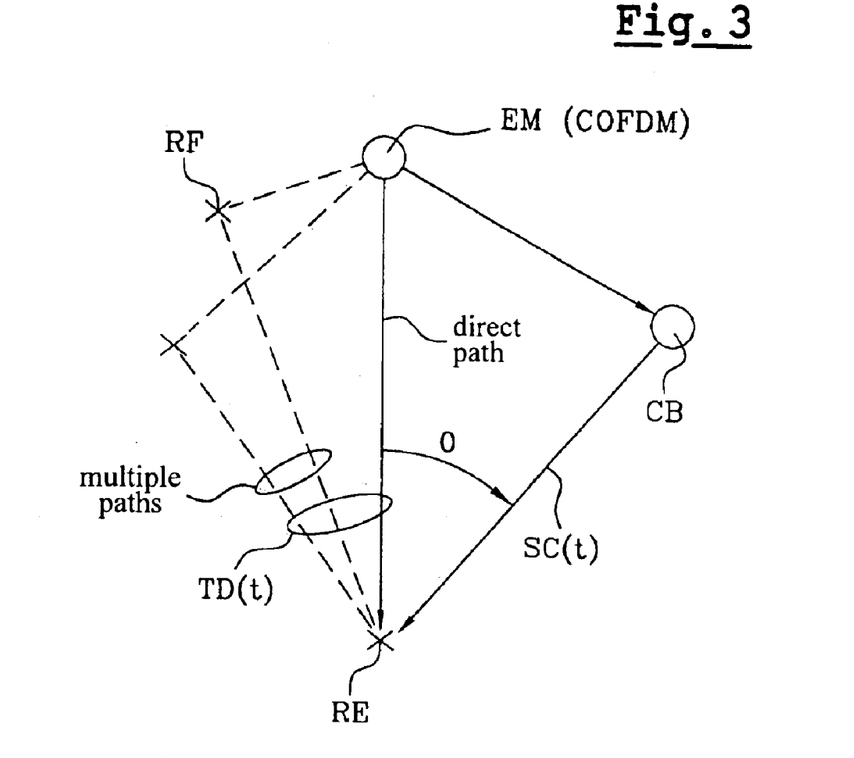
FIG. 3 is a diagram of the following paths between an emitter and a receiver: a direct path, multiple paths, and a path reflected by a target.

Consider for example the bistatic radar shown in FIG. 3 with an emitter EM radiating an electromagnetic power of $P_e G_e = 1\,000$ W, a receiver RE antenna gain of $G_r = 10$ dB, a wavelength of $\lambda = 1$ m corresponding to the frequency $F_0 = 300$ MHz, an receiver distance of d=40 km, an emitter-target distances EM-CB and a target-receiver distances CB-RE equal to 40 km, a noise factor of F=6 dB, a radar equivalent surface SER=0 dB, I=100 symbols of duration $T_S=1$ ms and a guard time of 250 μs for a frame duration of 125 ms, and K=1 500 carriers for a bandwidth of B=1.5 MHz.

Figure 4:
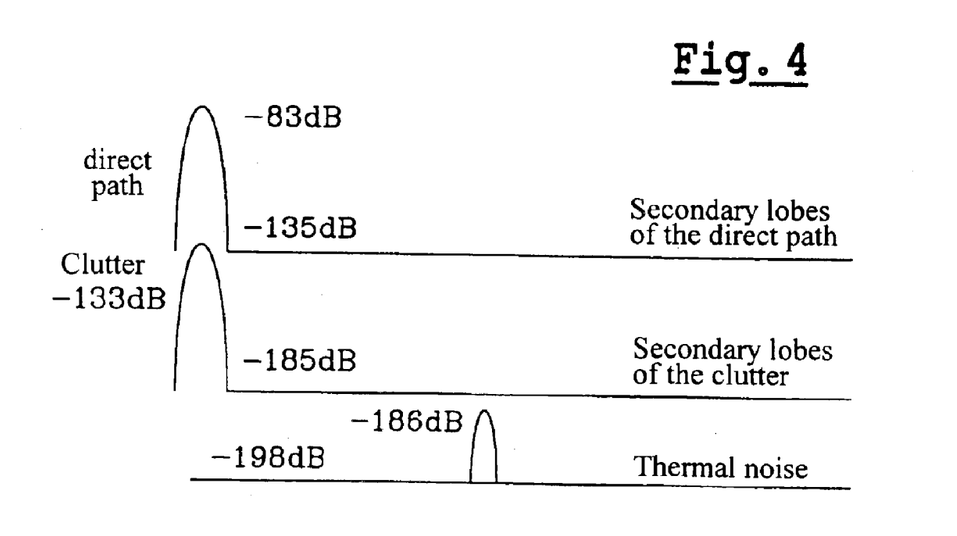
FIG. 4 shows the outputs of the various contributors (direct path, multiple paths, target, noise) to the output of the correlator.

FIG. 4 shows the link balance between the emitter EM and the receiver RE.

The energy contained in the secondary lobes attached to the direct path and to the clutter caused by the multiple paths dominates over thermal noise. The direct path lobe energy level is 186−135=51 dB above the presumed level of the target, which has a signal to thermal noise ratio of 198−186=12 dB.

The passive radar receiver according to the invention effectively rejects the direct path and clutter as well as the scatterers, such as interference signals, in a received broadband signal before Doppler-distance correlation in order to detect mobile targets.

Figure 5:
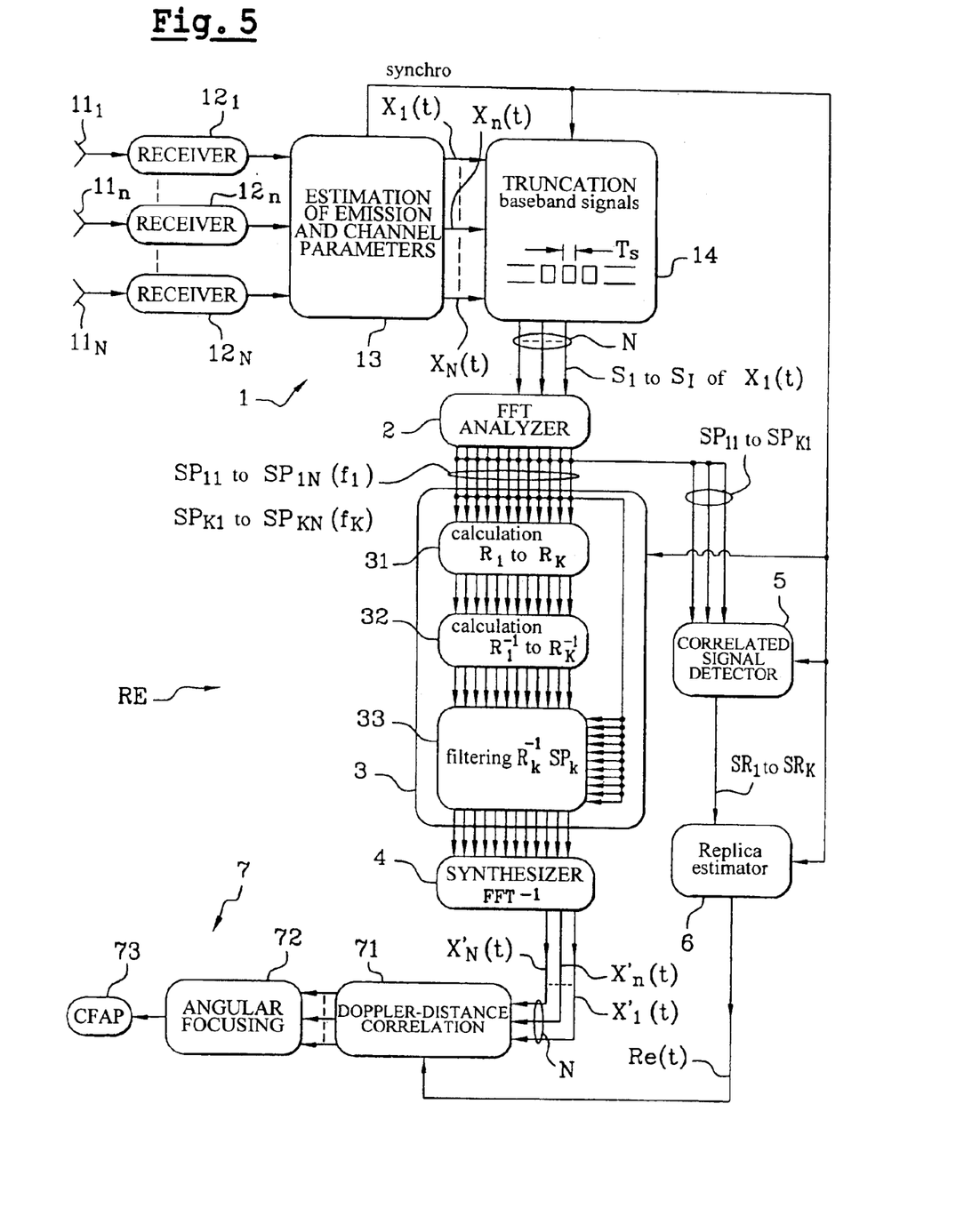
FIG. 5 is a schematic block diagram of a radar receiver with one antenna conforming to PCT International Application PCT/FR02/00224.

Referring to FIG. 5, a passive radar receiver RE in accordance with an array of antennas for OFDM signals, according to PCT International Application PCT/FR02/00224, comprises a received signal shaping circuit 1, a Fourier analyzer 2, a correlated signal filtering circuit 3, a Fourier synthesizer 4, a correlated signal detector 5, an emitted signal replica estimator 6 and a target determination circuit 7.

The received signal shaping circuit 1 conventionally comprises at its input an array of N receive antennas $11_1$ to $11_N$ connected to a plurality of respective receiver stages $12_1$ to $12_N$ for receiving COFDM radio and television broadcast signals, where N=2. Thus the radar receiver RE is structured in the form of N parallel receiver channels in and between the circuits 1 to 4 and 7 respectively associated with the antennas $11_1$ to $11_N$.

Following frequency conversion, each receiver stage $12_n$ with $1 \leq n \leq N$ digitizes the respective baseband radio signal $X_n(t)$ received and applies it to an emission and channel parameter estimator circuit 13:

$$X_n(t) = TD_n(t) + SC_n(t) + B_n(t),$$

where for each symbol emitted $$\sum_{k=1}^{k=K} C_k e^{2j\pi kt/T_S},$$

ignoring the index i of the symbol $S_i$:

$$-TD_n(t) = \sum_{k=1}^{k=K} H_{kn} C_k e^{j2\pi kt/T_S}$$

designates an OFDM signal received from at least one emitter EM or possibly from a plurality of OFDM emitters on direct paths and multiple paths caused by fixed reflectors RF and corresponding to clutter, as shown in FIG. 3; $H_{kn}$ designates a complex coefficient corresponding to the transfer function of the propagation channel EM-$11_n$ relating to these paths for the line $f_k$; the signal $TD_n(t)$ is constituted by overlapping unwanted zero Doppler effect signals caused by direct and multiple paths; these unwanted signals are referred to as "correlated signals";

$$-SC_n(t) = \sum_{k=1}^{k=K} h_c C_k e^{j2\pi k(t-\tau_n)/T_S} e^{-j2\pi vt}$$

designates a received OFDM signal caused by backscattering of emitted OFDM signals by at least one mobile target CB and thus subject to a non-zero Doppler effect; it constitutes the wanted signal to be extracted, whose power is very low compared to that of the correlated signal $TD_n(t)$; $h_c$ is the narrowband transfer function of the target CB, $\tau_n$ denotes the path difference between the direct path and the path reflected by the target, and $v$ is the Doppler frequency of the target;

$B_n(t)$ designates signals received in the wanted bandwidth, called scatterers, other than the correlated OFDM signals, such as interference and thermal noise signals.

The circuit 13 estimates the parameters of the emitted signal, such as the carrier frequency $F_0$ and the symbol period $T_S$, as a function of an analysis of the first two symbols $S_1$ and $S_2$ of a frame (FIG. 2) in the N received signals in order to constitute a time reference. Knowing the period $T'_S$ of the emitted signal and the duration $T_S$ of each symbol, the temporal length of the channel is deduced from the process of synchronizing the preceding time reference, by analyzing the signals received in each guard time Δ, which is greater than the temporal channel length.

The received signals are then periodically truncated in a truncator circuit 14. The stationary portion of the received symbols of duration $T_S$ is recovered by subtracting the portion of the received signals in the guard time Δ of each period $T'_S$ and in particular by subtracting the channel length deduced in each period.

Each portion of each of the received digital baseband signals $X_1(t)$ to $X_N(t)$ of duration $T_S$ is then applied to the Fourier analyzer 2. The analyzer produces the real and imaginary components of each signal $X_n(t)$ for each duration $T_S$ using the Hilbert transform and analyzes them using the fast Fourier transform (FFT) to supply the frequency spectrum of each symbol $S_i$ delivered by the truncator circuit 14. The analyzer 2 provides K spectral lines $SP_{1n}$ to $SP_{Kn}$ for each symbol of the received signal $X_n(t)$ relating to the frequencies $f_1$ to $f_K$ and applies them in parallel to a covariance matrix calculation module 31 in the filtering circuit 3. The information carried by each spectral line $SP_k$ relating to a frequency emitted independently of the other frequencies is related on the one hand to the coding of the corresponding spectral line and on the other hand to the transfer function $H_k$ of the propagation channel.

The filtering circuit 3 comprises three software modules, namely the module 31, an inverse covariance matrix calculation module 32, and a filtering module 33.

For each line $SP_k$ at the frequency $f_k$ delivered by the analyzer 2 the module 31 estimates an N×N covariance matrix $R_k$ in which a row of given rank n is made up of products of the received spectral line $SP_{kn}$ relating to a given antenna $11_n$ and the conjugates of the received spectral lines $SP_{k1}$ to $SP_{kN}$ relating to the N antennas $11_1$ to $11_N$, the products being averaged for symbols during a predetermined time period, with $1 \leq n \leq N$. The predetermined time period for averaging said products is preferably significantly longer than the symbol duration $T_S$, and is typically the duration of a frame, i.e. the products are averaged over I–1 symbols $S_2$ to $S_I$. The averaging of said products over a large number of symbols, i.e. over around 100 symbols constituting the frame, decorrelates the target signal from unwanted high-level signals received by the antennas. The mutual orthogonality of the spectral lines makes the covariance matrices $R_1$ to $R_K$ independent of the coding.

The module 32 then deduces and stores the inverse matrices $R_1^{-1}$ to $R_K^{-1}$ of the K covariance matrices. These K N×N inverse matrices are used as K filters in the module 33 for filtering K respective groups each having N spectral lines $SP_{11}$–$SP_{1N}$ to $SP_{K1}$–$SP_{KN}$ delivered by the spectrum analyzer 2. Each group of N spectral lines $SP_{k1}$ to $SP_{kN}$ received for a given frequency $f_k$ is therefore filtered by a filter which supplies for each symbol the product of the column vector consisting of the N spectral lines $SP_{k1}$–$SP_{kN}$ received for that symbol and the frequency $f_k$ and the inverse matrix $R_k^{-1}$. In the N groups of K filtered spectral lines, each supplied by the filtering circuit 3, the contribution of the correlated zero Doppler effect signals caused by the direct path and the multiple paths and the scatterers has been eliminated. The NK filtered spectral lines are then synthesized by inverse fast Fourier transformation ($FFT^{-1}$) in the synthesizer 4, which delivers to the target discriminator circuit 7 N temporal symbol signals $X'_1(t)$ to $X'_N(t)$ respectively including the target backscattering signals $SC_1(t)$ to $SC_N(t)$.

Figure 6:
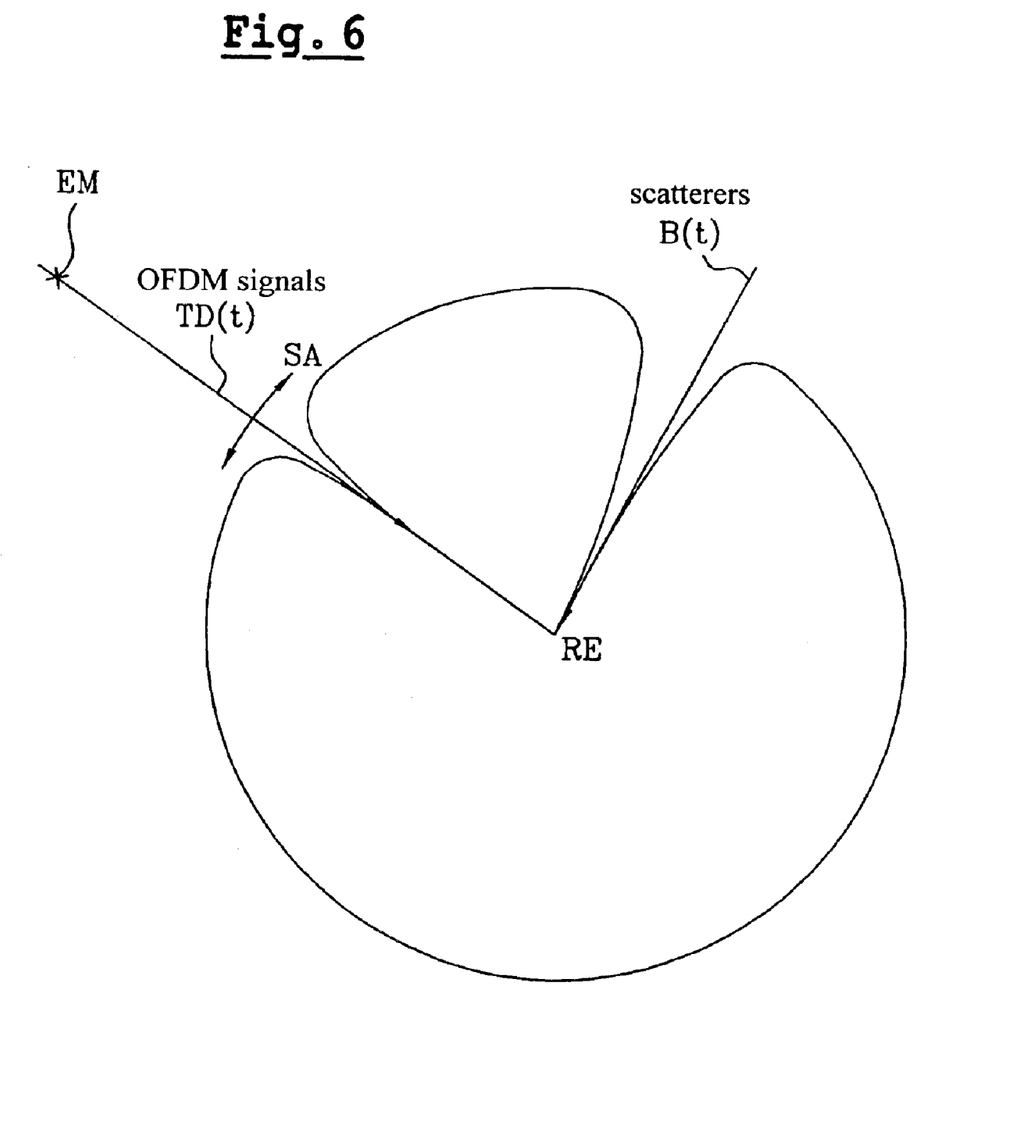
FIG. 6 is a schematic block diagram of a radar receiver with a plurality of antennas conforming to FIG. 5.

The radiation diagram of the signals $X'_1(t)$ to $X'_N(t)$ has blind axes, i.e. "gaps" in the directions in which the correlated OFDM signals $TD_1(t)$ to $TD_N(t)$ and scatterers $B_1(t)$ to $B_N(t)$ are received, as shown in FIG. 6.

During a recurrent learning phase in each symbol frame, the detector 5 deduces, from the K spectral lines of each symbol of the frame delivered by the spectrum analyzer 2 and relating to one of the shaped received signals, for example from the lines $SP_{11}$ to $SP_{K1}$ of the signal $X_1(t)$ received via the first antenna $11_1$, the spectral lines $SR_1$ to $SR_K$ of a reference signal $SR(t)$ such that:

$$SR(t) = \sum_{k=1}^{k=K} \overline{H}_k C_k e^{j2\pi kt/T_S} + b_1(t).$$

$\overline{H}_k$ is the mean of the I–1 coefficients of the propagation channel transfer function for the line $SP_{k1}$ during the symbols $S_2$ to $S_I$ of the frame received by the antenna $11_1$, in other words virtually $|\overline{H}_{k1}|=|H_{k1}|$, which improves the estimate of the transfer function of the channel by making it less dependent on the instantaneous amplitude and phase variations. This averaging means that the backscattered target signal $SC_1(t)$ can be ignored and thus the propagation channel and the correlated signals can be characterized. The noise signal $b_1(t)$ designates a mean of scatterers received during the frame, consisting essentially of thermal noise with a variance lower than that of the scatterers $B_1(t)$.

After estimating and storing the transfer function coefficients $\overline{H}_{11}$ to $\overline{H}_{K1}$ averaged over a frame, the detector 5 applies the spectral lines of the zero Doppler effect correlated signals averaged over a frame, i.e. the averaged lines $SR_1$ to $SR_K$ of the signal $SR(t)$ depending on the coefficients $\overline{H}_{11}$ to $\overline{H}_{K1}$ at K inputs of the estimator 6. The estimator 6 produces a "narrowband" emitted signal replica $Re(t)$ applied to N Doppler-distance correlators 71 in the target discriminator circuit 7:

$$Re(t) = \sum_{k=1}^{k=K} C_k e^{j2\pi kt/T_S}.$$

In a similar manner to a Doppler channel of the radar receiver disclosed in the French patent application FR 2776438, the target discriminator circuit 7 includes N Doppler-distance correlators $71_1$ to $71_N$ and angular focusing circuits $72_1$ to $72_N$. Doppler channels in each correlator $72_n$ are assigned a predetermined frequency offset relative to each other because of the Doppler effect. The Doppler channels constitute a plurality of speed cases of the filtered signal $X'_n(t)$ by changes of frequency and are each correlated, for each carrier $f_1$ to $f_K$, to the emitted signal replica $Re(\tau)$ in order to determine correlation peaks which are in distance cases corresponding to mobile targets. After summation, an angular focusing circuit $72_n$ determines mobile targets angular position cases. Finally, a constant false alarm processing (CFAP) circuit 73 extracts "plots" relating to position and speed data on searched-for mobile targets.

As an alternative to the above, the filtering circuit 3 is of the type shown in FIG. 5 of PCT International Application PCT/FR02/00224. The circuit 3 includes N subtractors for subtracting each of the K averaged lines of the reference signal $SR(t)$ corresponding to the averaged propagation channel transfer function coefficients $\overline{H}_{11}$ to $\overline{H}_{K1}$ and produced by the detector 3 from the K spectral lines of the respective received signal $X_n(t)$ in order to produce via the synthesizer 4 as many filtered signals $X'_1(t)$ to $X'_N(t)$ as there are antennas to be processed in parallel in the Doppler channels of the circuit 7.

Figure 7:
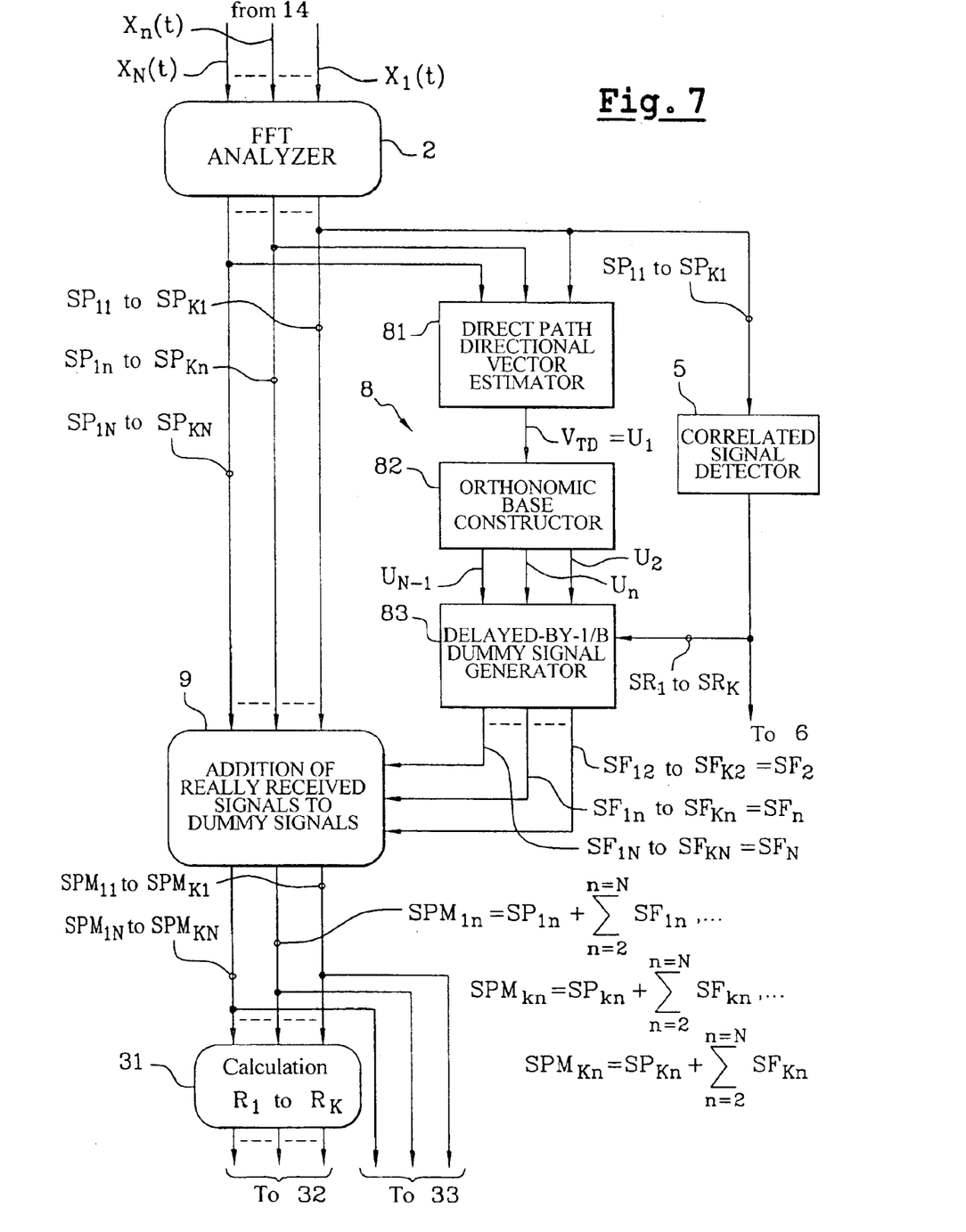
FIG. 7 is a schematic block diagram of a propagation channel modification circuit according to the invention for improving the radar receiver with a plurality of antennas shown in FIG. 5.

Referring now to FIG. 7, the invention essentially adds a propagation channel modification circuit 8 for eliminating the blind angular sector SA in the diagrams like that shown in FIG. 6 resulting from the rejection of correlated zero Doppler effect signals caused by the direct path and the multiple paths. The circuit 8 is connected between the KN outputs of the spectrum analyzer 2 and KN first inputs of an adder circuit 9 which receives via KN second inputs the spectral lines $SP_{11}$ to $SP_{KN}$ delivered by the spectrum analyzer 2.

The rejection of the direct path signal based on adaptive filtering implies losses related to the correlation or substantial colinearity of the directional vector relating to a mobile target and the real direct path directional vector. In particular, if the direct path is of the free space type, its rejection in accordance with the adaptive angular filtering principle conventionally gives rise to the phenomenon of the blind angular sector SA. The function of the circuit 8 is specifically to modify the direct path directional vector so that the direct path is rejected without the blind angular sector SA being generated, by limiting the losses associated with the correlation of the target vector and the direct path vector. The invention then modifies the colinearity of the target and direct path directional vectors, since it knows the reference signal $SR(t)$ produced by the detector 5 and primarily representative of the direct path signal, in order thereafter to reject the modified direct path directional vector, which is no longer colinear with the target directional vector.

However, eliminating a blind sector along the received direct path axis could generate another blind sector along the modified axis of the direct path. The invention also alleviates this drawback by averaging the losses caused by the modification of the direct path vector so that the space is observed with a quasi-isotropic coverage in the target determination circuit 7.

The modification circuit 8 essentially comprises three cascaded software modules, namely a direct path directional vector estimator 81, an orthonomic base constructor 82, and a dummy signal generator 83.

The estimator 81 processes the KN spectral lines $SP_{11}$ to $SP_{KN}$ supplied by the spectrum analyzer 2 and divides them into K groups ($SP_{11}$ to $SP_{1N}$) to ($SP_{K1}$ to $SP_{KN}$) respectively related to the K lines of the carriers $f_1$ to $f_k$ emitted, in order to determine K $N^{th}$ order covariance matrices $R_1$ to $R_K$. As in the calculation module 31 in the filtering circuit 3, a row of given rank n is made up of correlations of the spectral line $SP_{kN}$ relating to the antenna $11_n$ by the conjugates of the spectral lines $SP_{k1}$ to $SP_{kN}$ relating to the N antennas $11_1$ to $11_N$ and to the narrowband carrier $f_k$, and the spectral line products are averaged two by two during a predetermined time period greater than the symbol duration $T_S$, for example the duration of a frame.

The estimator 81 then calculates the determinants of the K square covariance matrices $R_1$ to $R_K$ in order to deduce therefrom the N proper vectors $V_{k1}$ to $V_{kN}$ with N components and the associated proper values $\lambda_{k1}$ to $\lambda_{kN}$ for each matrix $R_k$. The estimator 81 deduces the proper vector $V_{kmax}$ that is associated with the highest $\lambda_{kmax}$ of the proper values $$\lambda_{kmax} = \sup(\lambda_{k1} \text{à} \lambda_{kN})$$

and that corresponds to the direct path directional vector. The N−1 other proper values are associated a priori with noise.

Finally, the estimator 81 averages the K proper vectors $V_{1max}$ to $V_{Kmax}$ associated with the highest proper values, yielding a direct path directional vector $V_{TD}$ with N components:

$$V_{TD} = \left(\sum_{k=1}^{k=K} V_{kmax}\right)/K.$$

The constructor 82 constructs an orthonomic base of N orthogonal vectors $U_1$ to $U_N$ two by two, of which the first $U_1$ is the direct path directional vector $V_{TD}$. This vector base can take any form, i.e. is independent of the angular position of the receive antenna array $11_1$ to $11_N$ relative to the direction of the real direct path vector.

For example, using an iterative Schmidt orthonormalization algorithm, a second vector $U_2$ orthogonal to the vector $V_{TD}$ is created, then a third vector $U_3$ orthogonal to the first two $U_1=V_{TD}$ and $U_2$, and so on up to a vector $U_N$ orthogonal to the vector $V_{TD}$ and to the N−2 vectors previously created. The N vectors $U_1$ to $U_N$ of the base each have a modulus equal to that $\|V_{TD}\|$ of the direct path vector and N components in the "antenna initial frame of reference" defined by the N components of the direct path vector $U_1=V_{TD}$.

As an alternative to the above, the constructor 82 constructs the orthonomic base in accordance with other prior art methods based on the use of orthogonal projection or parameters of the function of the array of antennas.

To "desensitize" the "blind" directional vector $V_{TD}$ associated with the real direct path, the generator 83 generates N−1 "totally" correlated dummy signals coming from the space orthogonal to the "blind" direct path vector and applies them to the adder circuit 9. This modification of the real direct path propagation channel is reflected in the processing of a composite receive signal determined by a directional vector, part of which is orthogonal to the real direct path vector. The generator 83 participates in this desensitization for each of the emitted lines $f_1$ to $f_k$ in order to optimize the average losses and to process the composite signal with an isotropic spatial coverage in the circuits 3 and 7 after the addition circuit 9.

The generator 83 generates N−1 dummy emitted signals $SF_1$ to $SF_N$ that are proportional to the emitted reference signal SR(t) whose K spectral lines $SR_1$ to $SR_K$ corresponding to the frequencies $f_1$ to $f_k$ are supplied by the correlated signal detector 5. As shown diagrammatically by radiation diagrams $D_2$ to $D_N$ at a given frequency $f_k$ in FIG. 8, each dummy signal $SF_n$ spread over the useful frequency band $B=[f_1, f_N]$ of the real emitted signal, with $2 \leq n \leq N-1$, appears to come from a dummy emitter $EF_n$, whose direction relative to the array of receive antennas $11_1$ to $11_N$ is that of the respective vector $U_n$ of the orthonomic base supplied by the constructor 83 to the generator 83.

Figure 8:
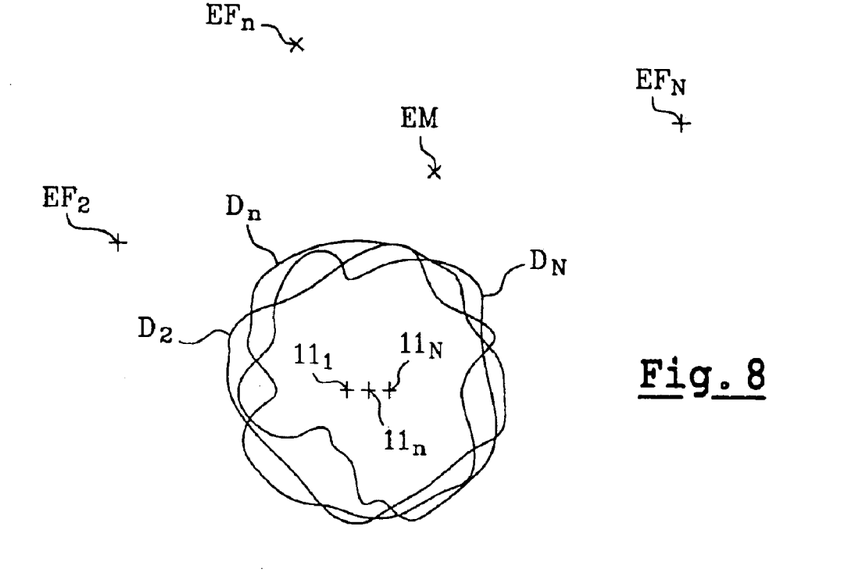
FIGS. 8 and 9 are diagrams respectively showing the overlapping of signals emitted by N−1 dummy emitters for a given frequency and the overlapping of N−1 dummy signals emitted to obtain isotropic losses in accordance with the invention.

In the generator 83 the time-delay $\tau_n$ between the direct paths from the respective dummy emitter $EF_n$ and from the real emitter EM to the respective antenna $11_n$ is predetermined by programming. Each time-delay $\tau_n$ with $2 \leq n \leq N-1$ is an integer multiple $M_n$ of the reciprocal $1/B$ of the bandwidth $B=[f_1, f_K]$ of the emitted signal, and the integer multiples $M_2$ to $M_N$ are different from each other. The set of dummy signals $SF_2$ to $SF_{N-1}$ creates with each respective received signal $X_n(t)$ a composite channel with a frequency period equal to the band B of the signals received by the array of antennas. The time-delays $\tau_2$ to $\tau_n$ differ by a step equal to $1/B$, for example, in increasing order of the index n from 2 to N, but can be different from each other, with any other regular or irregular distribution.

The lines $SF_{1n}$ to $SF_{Kn}$ of each dummy signal $SF_n$ with $2 \leq n \leq N$ are deduced from the products of the lines $SR_1$ to $SR_K$ of the reference signal and a respective angular coefficient depending on the direction of the respective vector $U_n$ of the orthonomic base and a respective time-delay coefficient depending on the respective time-delay $M_n/B$, where $M_n$ is different from $M_2$ to $M_{n-1}$ and $M_{n+1}$ to $M_N$.

Figure 9:
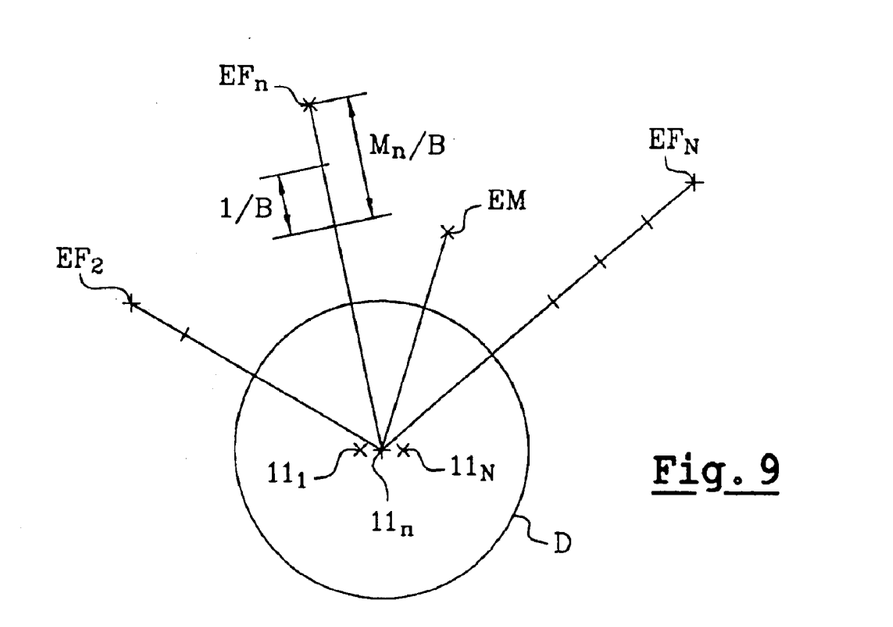

The K spectral lines of all the dummy signals $SF_2$ to $SF_N$ are respectively added to the K spectral lines $SP_{1n}$ to $SP_{kn}$ of each signal $X_n(t)$ really received by the respective antenna $11_n$ in the adder circuit 9. In other words, the line $SF_{kn}$ of the received signal $X_n(t)$ corresponding to the frequency $f_k$ is added to all the lines $SF_{k2}$ to $SF_{kN}$ of the N−1 dummy signals $SF_2$ to $SF_N$ in the adder circuit 9 to produce a line $SPM_{kN}$ of a resultant sum signal representative of a modified received signal $XM_n$. The circuit 9 applies the respective lines of the N modified signals $XM_1$ to $XM_N$ to the calculation module 31 in the filtering circuit 3, which processes them in the same way as the spectral lines of the respective signals $X_1(t)$ to $X_N(t)$ in the embodiment shown in FIG. 5. The composite channel created by overlapping the signals received and the dummy signals $SF_2$ to $SF_N$ is then rejected in mode of multiple narrowbands by the filtering circuit 3, but generates losses after rejection of the composite channel that are isotropic, as shown by comparing the overall radiation diagram D of FIG. 9 to that of FIG. 6. It can be shown that the signal to (noise plus interference-after-rejection ratio) has equal minimum and maximum values and consequently that the losses are isotropic and low, and equal to $10 \log [(N-1)/N]$ dB.

The emission reference signal SR(t) is thus used to reconstitute a dummy source comprising a plurality of dummy emitters. The signal SR(t) weighted by the respective angular coefficients depending on the vectors $U_2$ to $U_N$ of the orthonomic base in the generator 83 is added to each of the signals $X_1(t)$ to $X_N(t)$ received by the antennas $11_1$ to $11_N$ in the adder circuit 9. The dummy signals $SF_2$ to $SF_N$ reconstitute a specific propagation channel whose propagation vector is on average above the frequency band $f_1$ to $f_k$ of the emitted signal, and by design orthogonal to all envisagable free space directional vectors. In this frequency band, the average correlation of the dummy signals as defined above is equal to $1/N$, regardless of the free space target path, which implies maximum losses of 3 dB with a minimum of N=2 antennas. The coverage after filtering is thus "smoothed" and becomes isotropic.

As an alternative to the above, the detector 5 can correct the estimate of the spectral lines $SR_1$ to $SR_K$ of the reference signal SR as a function of the assumed direction of the target relative to the direct path directional vector $V_{TD}$ supplied by the estimator 81. This alternative anticipates the losses in the target direction that might result from decorrelation of the reference signal and the target signal after filtering effected.

What is claimed is:

1. A radar receiver adapted to process a radio signal received via a propagation channel and including frames of symbols each emitted on coded orthogonal carriers, said radar receiver comprising:

N receiver means,

N being an integer more than 1, shaping means for converting N signals received by said receiver means into N digital symbol signals, means for creating N−1 dummy signals that are analogous to a reference signal representative of unwanted zero Doppler effect signals in said N received symbol signals, said dummy signals being arranged to be emitted virtually along directional vectors orthogonal to each other and to a directional vector of a real direct path between a real emitter of said emitted symbols and said radar receiver in an N-dimensional frame of reference, and said dummy signals being arranged to be time-delayed relative to each other and relative to said real direct path by different integer multiples of the reciprocal of said bandwidth of said carriers, means for adding each received symbol signal to said N−1 dummy signals to produce modified received signals, filtering means for eliminating said unwanted zero Doppler effect signals in said modified received signals to provide filtered symbol signals including essentially signals backscattered by targets, and Doppler-distance correlation means for discriminating mobile targets in said filtered symbol signals.

2. The radar receiver according to claim 1, wherein said creating means comprises means for estimating said direct path directional vector with N components as a function of $N^{th}$ order covariance matrices each dependent on products of spectral lines of said received symbol signals two by two in a group relating to a respective carrier, means for constructing an orthonomic base made up of direct path vector and N−1 orthogonal directional vectors, and means for generating said N−1 dummy signals respectively as a function of products of said reference signal and angular coefficients depending on said directions of said N−1 orthogonal vectors and as a function of time-delay coefficients relative to said real direct path depending on products of said different integer multiples by said reciprocal of said bandwidth.

3. A radar receiver according to claim 1, comprising means for estimating coefficients of a transfer function of said propagation channel as a function of spectral lines of one of said received symbol signals for each symbol, and means for averaging said coefficients of said transfer function over each symbol frame in order to produce said spectral lines of said reference signal.

4. A radar receiver according to claim 2, comprising means for correcting spectral lines of said reference signal as a function of the direction of a target relative to the estimated direct path directional vector.

5. A radar receiver according to claim 3, comprising means for estimating an emitted signal replica as a function of said spectral lines of said reference signal, said estimated replica being correlated to said filtered symbol signals in said Doppler-distance correlation means.

6. A radar receiver according to claim 1,
wherein said filtering means comprises means for estimating $N^{th}$ order covariance matrices each depending on products of spectral lines of said modified received signals two by two in a group relating to a respective carrier, means for deducing inverse matrices of said covariance matrices respectively, and means for filtering said groups of spectral lines respectively relating to said carriers in said modified received signals by multiplying said groups of spectral lines by said respective inverse matrices to produce filtered groups of spectral lines, and said radar receiver further comprises means for synthesizing said filtered groups of spectral lines into filtered symbol signals including essentially signals backscattered by targets applied to said correlation means.

7. A radar receiver according to claim 6, wherein said spectral line products lines of said modified received signals two by two on which said covariance matrices are dependent depend on spectral lines of symbols and are averaged over each frame.

* * * * *

UNITED STATES PATENT AND TRADEMARK OFFICE
CERTIFICATE OF CORRECTION

PATENT NO. : 6,999,025 B2 Page 1 of 1
APPLICATION NO. : 10/469188
DATED : February 14, 2006
INVENTOR(S) : Dominique Poullin It is certified that error appears in the above-identified patent and that said Letters Patent is hereby corrected as shown below:

Title Page, Item (22), PCT Filed:
 Please amend the PCT filed data as follows: "Feb. 19, 2002" to
 --Dec. 19, 2002--.

Signed and Sealed this

Tenth Day of April, 2007

JON W. DUDAS
*Director of the United States Patent and Trademark Office*